(12) United States Patent
Muthusamy

(10) Patent No.: US 10,214,064 B2
(45) Date of Patent: Feb. 26, 2019

(54) RAIL CUM ROAD VEHICLES (RCRV) AND ECONOMY RAIL TRACK-CUM-CORRUGATED CONCRETE TRACK TO ENGAGE WITH CORRUGATED TREAD RUBBER WHEELS ON ALL ROADWAYS

(71) Applicant: Venkatachalam Muthusamy, Erode (IN)

(72) Inventor: Venkatachalam Muthusamy, Erode (IN)

( * ) Notice: Subject to any disclaimer, the term of this patent is extended or adjusted under 35 U.S.C. 154(b) by 0 days.

(21) Appl. No.: 15/862,799

(22) Filed: Jan. 5, 2018

(65) Prior Publication Data

US 2018/0126812 A1 May 10, 2018

Related U.S. Application Data

(63) Continuation-in-part of application No. 14/423,791, filed as application No. PCT/IN2013/000491 on Aug. 12, 2013, now abandoned.

(30) Foreign Application Priority Data

Aug. 30, 2012 (IN) .......................... 3588/CHE/2012

(51) Int. Cl.
*B60F 1/04* (2006.01)
*B60B 17/00* (2006.01)
*B61B 13/02* (2006.01)

(52) U.S. Cl.
CPC ................ *B60F 1/04* (2013.01); *B60B 17/00* (2013.01); *B60F 1/043* (2013.01); *B61B 13/02* (2013.01); *B60F 2301/00* (2013.01); *B60F 2301/10* (2013.01); *Y02T 30/30* (2013.01)

(58) Field of Classification Search
CPC .. B60F 1/04; B60F 1/043; B60F 1/046; B60F 2301/00; B60F 2301/02; B60F 2301/04; B60F 2301/10; B60F 1/00; B60F 1/005; B60F 1/02; B61B 13/02; B62D 1/265
USPC .................................. 105/72.2, 215.1, 215.2
See application file for complete search history.

(56) References Cited

U.S. PATENT DOCUMENTS

| | | | | |
|---|---|---|---|---|
| 1,937,532 A * | 12/1933 | Ronk | ........................ | B60F 1/04 105/72.2 |
| 3,019,742 A * | 2/1962 | Knox | ........................ | B60F 1/00 105/177 |
| 3,134,343 A * | 5/1964 | Koji | ........................ | B60F 1/043 105/26.1 |
| 3,892,187 A * | 7/1975 | White, Jr. | ................ | B60F 1/043 105/75 |
| 4,048,925 A * | 9/1977 | Storm | ..................... | B60F 1/043 105/177 |
| 4,468,966 A * | 9/1984 | Bradshaw | ............ | G01N 29/265 105/215.2 |
| 5,016,544 A * | 5/1991 | Woollam | ................. | B60F 1/043 105/215.2 |
| 2013/0305956 A1 * | 11/2013 | Jackson | .................. | B61C 13/00 105/72.2 |

* cited by examiner

Primary Examiner — Mark T Le

(57) ABSTRACT

A rail cum Road Vehicle (RCRV) running on rail tracks or on plain roads, includes a gas powered hybrid engine coach linked to and pulling one or several passenger coaches or goods vehicles, all of which in common are fitted with pneumatic rubber wheels, steel wheels, air suspension system with hanger brackets, air brakes and couplers.

10 Claims, 8 Drawing Sheets

RAIL CUM ROAD VEHICLES (RCRV) AND ECONOMY RAIL TRACK-CUM-CORRUGATED CONCRETE TRACK TO ENGAGE WITH CORRUGATED TREAD RUBBER WHEELS ON ALL ROADWAYS

CROSS-REFERENCE TO RELATED APPLICATIONS

This application claims a benefit of priority under 35 U.S.C. § 119 as a continuation of U.S. patent application Ser. No. 14/423,791 filed on Feb. 25, 2015, which claims priority to PCT/IN2013/000491 filed on Aug. 12, 2013, which claims priority to 3588/CHE/2012 filed in India on Aug. 30, 2012, which are fully incorporated herein by reference in its entirety.

FIELD OF THE INVENTION

The invention relates to Rail-cum-Road Vehicle (RCRV) comprises of Hybrid Engine coach coupled with Trailer-cum-Semi Trailer/Passenger coach/Caravan/Ambulance, Economy Sleeper and Rail Track-cum-corrugated Concrete Track to engage with corrugated tread rubber wheels there for on a portion of all the existing roadways/expressways, for fast mass transportation of passengers and goods within the cities, inter cities and inter states, with facility for door to door loading and delivery of various goods.

BACKGROUND OF THE INVENTION

The existing, more than one and a half centuries old road vehicles, heavy railway trains of passenger coaches and wagons, heavy and slow trams and the huge cost metro and mono trains are all known. Because of many advantages in rail journey, people prefer it. But unfortunately the existing railways could not accommodate more passenger coaches or wagons, as they already reached a saturation point. The main problem with Railways is the high construction cost of their rail tracks. It is around 50-70 million rupees per Kilo meter track, excluding the cost of land and rolling stock. But alas!, for the elevated Chennai Metro Rail, the average cost per k.m. is about 4000 million rupees! These costs are excluding the prohibitive cost of Rolling stock. Trams/Street Rail cars are no exception. So, all developing and poor countries could not afford to spend for such costly rail net work. Also, so far, there was no any alternative economic rail transport technology like RCRV available to the public throughout world.

Regarding freight movement also, either rail or road transportation did not at all satisfy people. There is enormous delay and theft in rail transport. In road transport, the freight charge is exorbitant as road vehicles consume more than 7 times fuel than rail vehicles. And all roadways have become nightmarish battle ground and PANDEMONIUM on our planet though GOD created it as a wonderful PARADISE. The shocking fact that the international crimes committed by the Automotive Industries is that the quantum of precious fuel unmindfully burnt in the last 100 years alone by their gas guzzling road vehicles, would have been last for another 400 years, had the global rail transport system been implemented 100 years ago. Now pessimism prevails among Economists and Environmentalists as countdown already started that the entire oil fields in the world would certainly go dry after 20 or 25 years. So, they seriously warn that the existing world-wide transport net work may collapse and the mankind has to face the aftermath doom and gloom.

When such is the present world's burning crisis, no attempts of any kind have so far been made to revolutionize the heavy, costly, slow moving and obsolete TRAMS/Street rail cars and the killer road vehicles. But to make vehicles to be user-friendly, some attempts had been made for decades by few citizens in the world to create COMBINED ROAD & RAIL VEHICLES. But unfortunately all the embodiments of their inventions had been found to be deficient in technologies and unsafe to run on rail tracks as detailed below:

Cumbersome equipments to lift and lower the axles with rubber wheels and steel wheels, then complicated construction of guides to place the vehicle on rail track from plain road, then fitting motors to rubber wheels to move along rail track, without applying mind how the motor will run the vehicle on plain roads without electricity and then other embodiments were orientated with the existing heavy railway bogies. The width of rolling stock of broad gauge is more than 3 meters whereas the width of roadways trucks and buses are about 2.5 meter only. Therefore roadways commercial vehicles may not suit for broad gauge rail track. Only standard gauge rail track will suit roadways heavy vehicles. In another dangerous embodiment, both steel wheels and rubber wheels were designed to bear and share the vehicle load equally while running fast, may lead to derailment and more consumption of fuel due to continuous friction/adhesion of rubber wheels on its road track; in another embodiment, convex steel wheels had been designed to run on concave rails and vice versa. This system will lead to derailment as the natural oscillating tendency of running trains due to wind force and deflection of rails in between sleepers will damage such wheels and rails, which cannot be prevented. In another prior art, in the same axle, along with flanged steel wheels, larger dia rubber wheels had also been fitted and at points of level crossings and other rail crossings, it was claimed, the rubber wheels automatically deflate and then inflate while running fast on rail tracks. Can anyone rely on such dangerous technologies playing with the lives of thousands of passengers?

According to one prior art, a camera will guide the vehicle. In another embodiment of a prior art, the larger dia rubber wheels rotate along with smaller dia steel wheels on the same axle. But there was no fool-proof technology applied to safeguard the vehicle while crossing at points of "NO-RAIL" level crossings and other railway crossings where the larger dia rubber wheels need sufficient space or guide to pass through. This is a very very critical issue. At level crossings, if there are no rails, the train's rubber wheels take the entire load and cross the plain road on ramp with the help of guides. Still, there will encounter another big problem i.e. the larger dia rubber wheels cover more distance than the smaller dia steel wheels as both are fitted on the same axle. So when the idly rotating lifted larger dia rubber wheels suddenly lowered and made to take the entire load and run on ramp, it will create a sudden and violent JERK to the entire train leading to imbalance, disturbing passengers. Further, this kind of frequent disturbances will damage the couplings and joints and rubber wheels may also burst. Then, while crossing the plain roads at level crossings what type of mechanical or electronic devices guide the larger dia rubber wheels on ramps, had not been disclosed in that embodiment. Then comes another problem; while the larger dia rubber wheels cross other existing rail tracks, what type of guide was designed, has also not been disclosed; then while moving from loop line to main line and vice versa the same problem encounters and there was no solution explained in those embodiments.

In the present applicant's own two patent applications No. 466/DEL/2000 dated 28 Apr. 2000 and another No. 162/MAS/2001 dated 22 Feb. 2001, the embodiments of the inventions were, while running on plain roads, in the R.C.R.V. a modified semi trailer, rubber wheels were used and while running on rail tracks of existing railways all the rubber wheels had to be removed from its axles and stored in its compartment under the chassis. In the other it was road rail truck to run on rail track laid on roadways. Though the design was simple, fitting and removal of rubber wheels was a laborious job. Therefore those two patent applications had been abandoned.

Above all, it is known to many that when brake is applied to the existing railway train while running fast, it stops only after running a long distance depending upon its total load, the moisture on rail tracks and gradients. But in combined Rail-cum-Road Vehicle train the paramount critical aspect lies in its mandatory precision emergency brakes.

But in all prior arts there was no mention about such important and effective braking system. Unlike the existing railways, the present super fast Rail-cum-Road Vehicles will run on rail tracks laid along with safety fencing on its both sides on all roadways where all sorts of other road vehicles ply and pedestrians cross tracks at points where there is no fencing. So it would be fatal if there was no precision braking system in the R.C.R.Vs. That was why the heavy TRAMS/street rail cars move very slowly because of its obsolete design and ineffective braking system throughout world.

Therefore all the related prior arts could not succeed to commercialize their patents in the absence of safety, comforts, speed, simplicity, economy and eco-friendliness.

It is known, on one side, unlike in other countries where so many private companies profitably run their own Railways, unfortunately in India the hierarchical monopoly of 150 years old railways belongs to Indian Government now after Independence. So they are not showing any interest to expand rail net work throughout India at least by encouraging any private innovations of rail-cum-road vehicles because they have the Research, Development and Standards Organization. (RDSO) for their own heavy railways investing public money of trillions of rupees on rolling stock without proper returns.

Then, on the other side, when already the entire roadways net work is heavily stampeded with the existing multi-million road vehicles, and in the absence of sufficient economic mass transport system, multi-national companies grabbed the opportunity and now fishing in troubled waters.

The major vested interests are the Automotive Manufacturers, joining hands with all loaning banks, sell vehicles, even to persons who don't need them and who cannot afford to maintain vehicles, without caring for the tens of thousands of fatal accidents and chaos caused by their killer road vehicles on all roadways throughout India and all over the world.

To sum up, the International Community is very much shocked and disgusted over the existing sluggish, dangerous and obsolete transport system, not able to cope up with the present era of advanced high speed information technology and population outburst. This acute imbalance seriously hindering industrial and agricultural growth, per capita income and socio-economic development. In the United Nations Framework Conventions on Climate Change, all countries, in one voice, expressed their growing concern about carbon emission and global warming and also their helplessness to find out a radical innovation to control it. However, developed countries, now pointing their fingers towards the highly polluting India, China and Brazil and pressurizing them for more carbon cuts.

SUMMARY OF THE INVENTION

Accordingly, to achieve the above objects, the present invention provides a device called "rail-cum-road vehicle [RCRV] comprising of a hybrid engine coach coupled with a trailer-cum-semi trailer/passenger coach/caravan/ambulance, economy sleepers and rail track-cum-corrugated concrete track to engage with corrugated tread rubber tyres there for."

In accordance with one embodiment of the present invention, the rail-cum-road hybrid engine coach is an independent vehicle capable of running on rail track or plain road. It contains in-built 4 nos. of axles with 4 pairs of rubber wheels and 3 nos. of axles fitted with 3 pairs of steel wheels. The front axle with a pair of rubber wheel is controlled by steering mechanism and while running on rail track the steering mechanism is locked so that the lateral movements of the front wheels is arrested. Next is an axle with a pair of flanged steel wheels.

The weight of all the steel wheels is reduced to the required level as the weight of RCRVs and its maximum axle load capacity is less in comparison to the existing heavy railways. The overall diameter of the flange of steel wheels is increased by 10 milli meters as compared to the existing flanged steel wheels of Railways. The third axle with a pair of power drive rubber wheels is connected from their inner side—to the $4^{th}$ crown/differential-axle with a pair of power drive flangeless steel wheels, by a pair of sprocket and chain—to the outer ends of steel wheels. The $5^{th}$ pair of rubber wheels are supported with wheel studs/split-axle suspension at both the ends under the 'circular bogie'. The $6^{th}$ crown/differential-axle with a pair of power drive flanged steel wheels under the circular bogie is connected to the $7^{th}$ axle with a pair of power drive rubber wheels by sprockets and chains which is also under the circular bogie.

Therefore the $5^{th}$, $6^{th}$ and $7^{th}$ axles are fitted under the circular chassis forming a BOGIE which differs from the existing heavy railway bogie. Its diameter is equal to the width of its RCRV with its cross bars to support the axle of flanged steel wheels and axles of rubber wheels with hanger brackets and air bags. Its centre plate with a hole for a stud allows another centre plate with a heavy stud at its centre point fitted underneath the rear side of body chassis frame—to exactly sit into it and then the stud end is tightened with a heavy washer and nut with cotter pin at the bottom of the circular bogie so that it will remain intact with the body chassis frame. This centre plate will share the load of RCRV along with 8 nos, of steel rollers fitted around the top of circular bogie. In between the two centre plates, a greased hard rubber mat will lubricate and reduce noise and vibrations and allow smooth lateral movements of body frame over it at tight curves. This BOGIE with a single axle and a pair of flanged steel wheels is balanced with 4 rubber wheels at its both sides. This "circular bogie", because it is lighter in weight and serves multi-purpose both on rail track and also on plain road running, it is made as a part and parcel of all long and heavy RCRVs. On rail track, with its smooth automatic circular movements up to about 35 degrees, helps pass through at tight curves and while running on plain roads, with the help of its motorized circular rack and pinion controlled movement, works as "rear steered rubber wheels" while negotiating tight curves, hair pin bends, narrow roads and while parking with self locking arrangement as and when required, all under the control of the driver while running on plain roads.

Air suspension system is known and is in the market. But in accordance with the present invention, its improved and advanced system is introduced in RCRVs. In the prior art, the high pressure air which is produced by high pressure air compressor, has limited use for braking system and inflate air bags of air suspension of individual road vehicles only and the high pressure air is vented from each air bag whenever deflation is required. But in the present invention, in most cases, plurality of RCRVs move on rail track, and therefore more high pressure air is required for all vehicles in tandem. To meet this requirement, preservation of the air is necessary to reduce the load on air compressor. To achieve this, motorized high pressure air valve pump is fitted at right and left side of each RCRV, which are not shown in the drawings. When the RCRV train moves on tight curves, for example, to the right direction, all air bags of right side RCRVs will be half emptied by the right side high pressure air valve pump by transferring the air to all left side air bags fully inflating them so that the left side vehicle height is increased while simultaneously decreasing their right side height of air bags to enable the train to continuously move fast even at curves by better maintaining its centre of gravity. The same technique is followed for the left directional curves. To enable this system function perfectly, in each RCRV, at its right and left side, one "on-off switch" of the high pressure air valve pump is fitted at the bottom-most middle point of RCRV's full length at under carriage positioning the spring loaded switch lever projecting downwards, so that when it strikes the rod installed for this purpose at right side of inner rail track, at just few meter distance before commencement of the right directional curve, the system starts its above explained function automatically. To neutralize this or to bring both sides' air bags to same height, the right side bottom switch will again strike another steel rod projection installed for this purpose at inner right side of rail track just few meters before the end of the curve. Similar technique is followed for the left directional curves. For other functions such as lifting of some axles while on move and air requirement for braking, the existing system will continue.

In accordance with another embodiment of the invention, suitable gas engine is fitted at front end middle of the chassis and is connected to the main gear box through a link gear box which has 3 gears. The primary gear is connected to the engine at one side by means of a spring loaded, grooved coupler with a guide for gear rod and the other side is connected to the main gear box by means of a coupler. The middle gear wheel in the link gear box with a guide for another gear rod is an idle gear wheel which connects the primary gear to the gear wheel of "motor-generator" which remains adjacent to the engine. The main gear box with extra top gear applicable to super-fast engine and automatic transmission system is connected by propeller shafts to the $4^{th}$ and $6^{th}$ crown/differential axles with steel wheels which again transmit their drive to their $3^{rd}$ and $7^{th}$ axle rubber wheels respectively by means of a pair of sprocket and chain. Thus the hybrid RCRV engine, is provided with 8 wheel drive system i.e. 4 steel wheel plus 4 rubber wheel drive. Since the RCRV train of passengers or goods will be driven by two hybrid engine coaches, one in front and another at rear side, totally 16 drive wheels will pull and push the train comfortably.

Another embodiment of the present invention is the MULTI-FUNCTIONAL, CORRUGATED CONCRETE TRACK FOR CORRUGATED TREAD RUBBER WHEELS. This is one among the "corner-stones" of the present invention as explained already. Steel rack and pinion system is known and functions in the Mountain Railways. But its speed is only around 8 Km. per hour. Its engine weight is enormous and hauling capacity is very less. But the light weighted RCRVs with more power and with the above corrugated concrete track and corrugated rubber wheels which functions like "rack and pinion" can climb the hill with double the speed and double the load! While running on the RCRV rail tracks on the existing roadways and express-ways, at the will of the driver, the corrugated tread rubber wheels will strongly engage/grip with the corrugated concrete track in order to prevent slippery of steel wheels over rail track while starting and picking up speed, while climbing up-gradient, to control speed in down gradient and for emergency braking.

Another embodiment of the present invention is the "rail track brake". RCRVs run on rail tracks laid on the existing roadways and express-ways with safety fencing on both sides of the track. However, at some 'no-fencing points' where pedestrians and vehicles cross the track, this RAIL TRACK BRAKE along with other brakes will immensely help stop the RCRVs instantly. This device is fitted in each RCRV mandatorily at tandem with axles of steel wheels. It is light weight with simplified operation in comparison to the existing track brakes of railways and trams which are very heavy and very costly.

In accordance with one embodiment of the present invention, an articulated hybrid engine coach has the same features as in hybrid engine coach except the circular bogie and the $5^{th}$ axle and its rubber wheels have been removed. Also the flangeless steel wheels of $4^{th}$ axle have been replaced with flanged steel wheels. The articulated centre point is fitted with the cross bar of chassis at the end of $4^{th}$ axle of flanged steel wheels and the last two axles are under the articulated chassis. Since the propeller shaft has universal joints at its both the ends, this articulated RCRV is able to pass through tight curves comfortably.

In another embodiment of the present invention, the Mini hybrid engine coach is the same as the hybrid engine coach but without axle no. 3 and 4. This is for hauling light load and for use as fast tram.

In accordance with one embodiment of the present invention, in the "Trailer-cum-semi trailer, next to its usual "King Pin" and the usual landing gear/telescopic front legs, the front axle with flanged steel wheels are fixed with a detachable steel frame with air bag suspension under it. The rail track brakes are fitted behind the flanged steel wheels and on the other side a light axle with a pair of mini flanged steel wheels are fitted under the frame with a telescopic vertical support for the purpose of moving out the entire frame, if it is detached from the trailer. Its rear "circular bogie" is the same as in its hybrid engine coach but without its crown/differential boxes and sprockets and chains which are not required for the trailer. To bear more load while running on plain roads, there is one axle with a pair of rubber wheels and usual fittings fixed to the chassis just before the circular bogie.

In accordance with another embodiment of the present invention, the passenger coach at its rear end has the same "circular bogie" as in the trailer-cum-semi-trailer. At its front end is fitted with an axle and two flanged steel wheels with the usual fittings. At its behind, a pair of rail track brake is fitted with the support of the extension from the flanged wheels' axle-air bag arms. Its next axle is with a pair of rubber wheels.

In another embodiment of the present invention, the Caravan/Ambulance both have the same wheel arrangements. Its front axle has steerable rubber wheels. Its $2^{nd}$ and 3rd axles are with flanged steel wheels and have the minimum wheel base so that it does not require the circular bogie. Its $4^{th}$ rear axle has been converted into wheel studs/split axles with rubber wheel drives. Its suitable capacity engine with gear box and crown are fitted at the rear side of the vehicle. The drive rods at both sides of the crown drive the rear rubber wheels. While on rail track as one among 50 or 60 RCRV caravans in tandem, its 4 flanged steel wheels take the load when the front and rear RCRV hybrid engines pull and push the train. These caravans are more comfortable, luxurious, most safer and economical than the costly luxury cars. The RCRV ambulances on rail track will reduce travel time, violent siren noises and help save patients with timely medical treatment.

In accordance with another embodiment of the present invention, to suit the light weighted RCRVs, an economy rail track with light weight and lesser numbers of sleepers are laid on the hard surface roadways and expressways and so there is no need of any ballast at all. In the existing rail tracks of the heavy rolling stock, because of rail tracks are laid on soft earth and upon ballast and then on the extra heavy sleepers, deflection of rails between the sleepers during running of trains, is an unavoidable perennial problem. Whereas RCRVs will never face such problem as its rail track is laid on hard surface and so deflection problem is totally eliminated. Due to deflection, the heavy existing trains tend to unbearable oscillations with disturbing vibrations and noises in addition to speed reduction and requirement of extra power to make up the power loss due to deflection, whereas it is easy and most economical to construct rail tracks on the existing roadways and expressways because lesser weight rails and lesser numbers of light weighted sleepers will serve the purpose.

Another embodiment of the present invention is the simple design of the light weighted sleepers. The "rail bearing plate" at both the ends of a sleeper and its inverted tee section tie-rod are all made out of steel. It may be of steel casting or steel forging with required hardness and tensile strength. Its minimum thickness/height at 'inner rail bearing area' is about 15 mm with 1 in 20 slope. Its overall width is around 160 mm and length is about 250 mm, excluding the tie-rod and its bracket. The exact size groove at bottom will accommodate the flat footed bottom of the rail to rest at bearing area. Two moulded jaws of about 50 mm width will hold the outer flat foot bottom of the rail. But to hold the inner flat foot bottom of rail, a separate single loose piece forged steel with double jaws of similar size with suitable holes just below each jaw for bolting it to the bearing plate to hold the rail firmly. In between the two jaws at both sides there is space with suitable holes for the grouted high tensile bolts to hold the rail along with the sleeper/bearing plate with rectangular washers and nuts firmly to the hard road surface. To hold the rails on the hard road surface, holes are drilled on the road surface at the point where both sides of flat bottom of rails rest on the bearing plate of light sleeper placed at one-meter distances under the rails, and required size bolts are grouted strongly to the earth.

When all the bearing plates of light sleepers have two holes for the grouted bolts, the wider size bearing plates of sleepers at rail joints will be about 230 mm wider with 4 holes per bearing plate with 3 jaws to hold two rail joint and its length about 250 mm. The rail joints may be welded together with usual method. After completing the rail track construction and after trial run of RCRVs, corrugated heavy reinforced concrete slabs may be separately made and paved at both outer sides of rail tracks 'throughout its length as concrete corrugated track for rubber tyres. Its width may be about 600 mm for the standard gauge RCRVs, to accommodate 'super single wider tyres' with corrugated treads to match and engage the corrugated slabs. The level of the slab may be about 30 mm lower than the rail head level for expressways and in cities it will be at same level, or wherever it is necessary including inner rail track levels to facilitate free movements of other vehicle traffic across rail track.

In accordance with another embodiment of the present invention, a simplified technique to place the RCRVs on rail track from plain roads is to be followed. In normal occasions, at terminals also, the hybrid engines and passenger coaches will always remain on rail tracks only, as they resume their return journey by moving on the circular track. But the trailer-cum-semi-trailers, at terminals, will be hauled away from rail tracks with the help of stand by tractors and the incoming trailer cum semi trailers will be placed on rails from plain roads. Because the RCRVs. have "single axle-steel wheels circular bogie" it is easy to place it on rails from the plain roads. Since all the rubber wheels' outer edge of all trailer cum semi trailers are standardized and is aligned on straight line irrespective of whether the tyre width is wider or thinner, it facilitates easy placement on rails. At terminals where the RCRVs are placed on rails, the rail head and road surface will be on same level. Bright and permanent thin lines are made on the plain road at both sides of the track which must be in alignment with the outer border of the RCRV. The driver of the tractor while moving the trailer cum semi-trailer backward to place it on rail track, should be able to see the bright line. When the outer edge of rear side rubber wheels are in alignment with the bright line, he slowly lowers the rear axle of steel wheels on the rail track and simultaneously lifts the rear rubber wheels. When minor alignment is required, the motorized circular bogie makes minute movement to place the wheels on rails. Then the front steel wheels are easily placed by the driver by moving the vehicle little forward right or left and then by slowly lowering the steel wheels and lifting the rubber wheels. Other smaller RCRVs and articulated RCRVs without circular bogie are placed on rail track by aligning its outer border with the bright lines drawn there on the road. Thus there is no need of any special guide for the purpose.

Another embodiment of the present invention is, construction of RCRV rail track over the existing other Railways' rail track. It is known the existing heavy rail track should not be disturbed in any way. Therefore the RCRV rail track at the spot where it encounters the main line, is cut into two sections and each section is hinged to the end of RCRV track at both sides of the main line. To allow the main train to pass through the crossing spot, both the RCRV'S HINGED rail track section of a length of about two meters at each side is lifted by the same mechanism used for lifting the existing barriers of level crossing. After crossing of the main train, the two rail track sections are lowered like a barrier and by self locking the flat footed bottom of rails with the ground end-support-plate fitted at the middle of the main rail track which, in no way, will disturb running of main line trains.

BRIEF DESCRIPTION OF THE DRAWINGS

The exemplary embodiments of this invention are illustrated in the accompanying drawings and 3D images.

DETAILED DESCRIPTION OF THE INVENTION

Figure 1:
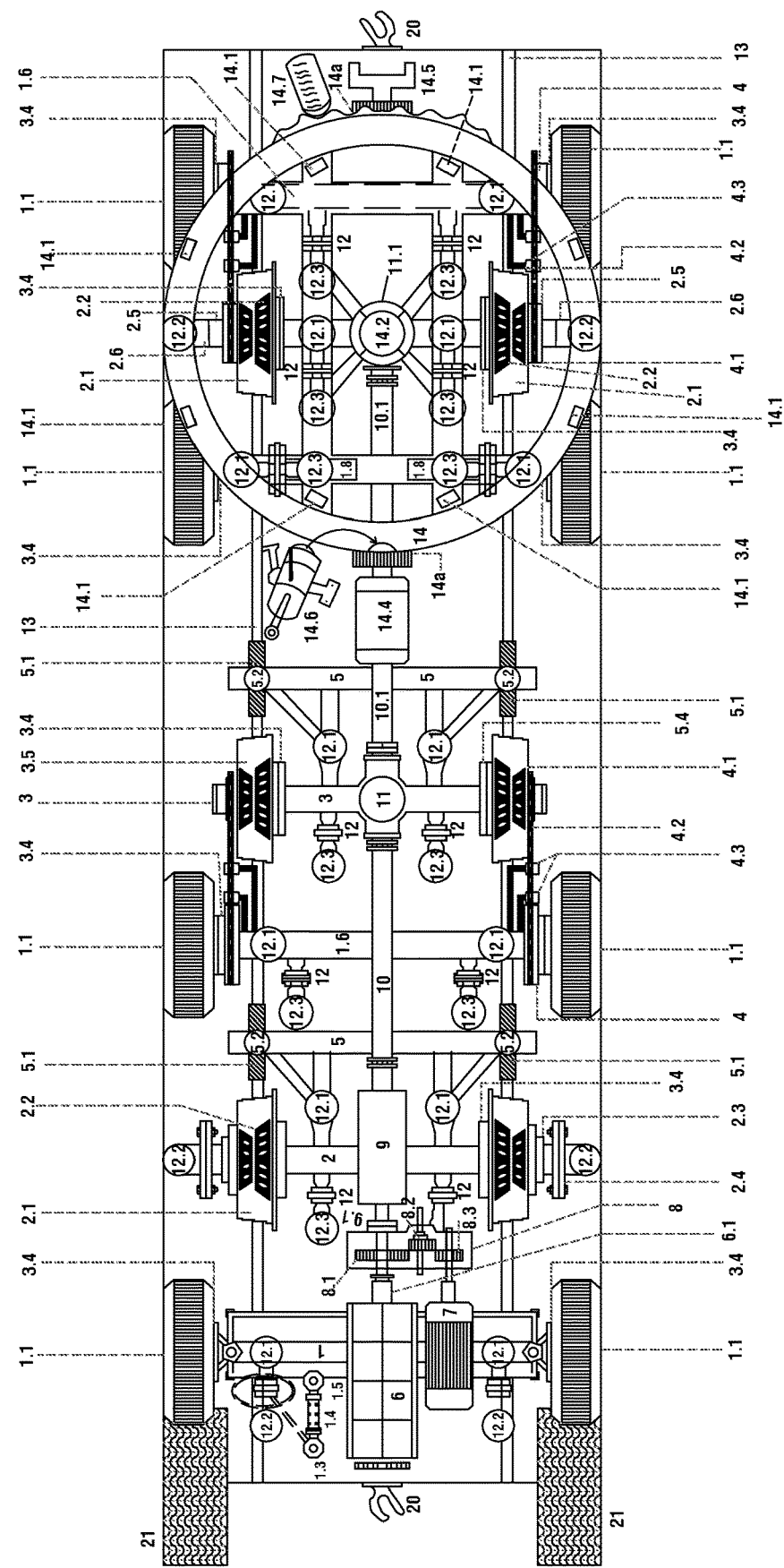
FIG. 1 depicts a top view of a Rail cum road vehicle, according to an embodiment.

Detailed explanation of the preferred embodiments of the present invention is made below in the exemplified forms with reference to the accompanying drawings. It is noted here that dimensions, materials, shapes and relative arrangements and the like of components described in these embodiments are mere examples for explaining the present invention, and should not be intended to limit the technical scope of the present invention unless otherwise specified. Further, like reference numerals are used to denote like parts throughout the accompanying drawings in order to abbreviate duplicate explanation thereto.

First Embodiment

FIG. 1 is a plan view of the present invention of Rail cum Road Vehicle being a Large Hybrid Engine Coach, a high capacity independent prime mover on rails or on all roadways. On rails, it can pull plurality of passenger or freight vehicles. It has 4 pairs of rubber wheels 1.1 and 2 pairs of flanged steel wheels 2.1 and one pair of FLANGE-LESS steel wheels 3.5.

As shown in the FIGURES, a solid axle 1 is the front axle with rubber wheels 1.1 and controlled by steering wheel 1.2 and its end pinion 1.3 which is connected to steering end arm 1.4 and fitted to the tie rod 1.5.

As shown in the FIGURES, in a solid axle 2, flanged steel wheels 2.1 with taper roller bearings 2.2 are fitted with the support of threaded bush with multiple holed end flange 2.3 to hold steel wheel 2.1. To prevent loosening or tightening of the threaded bush 2.3 over the solid axle, a multiple holed flanged square block with square hole 2.4 matching the axle's square end is fitted and bolted to the flange of the threaded bush 2.3. This square block also hold an air bag 12.2 on it at solid steel wheel axle's both the ends to support its super structure, the main chassis.

Figure 2:
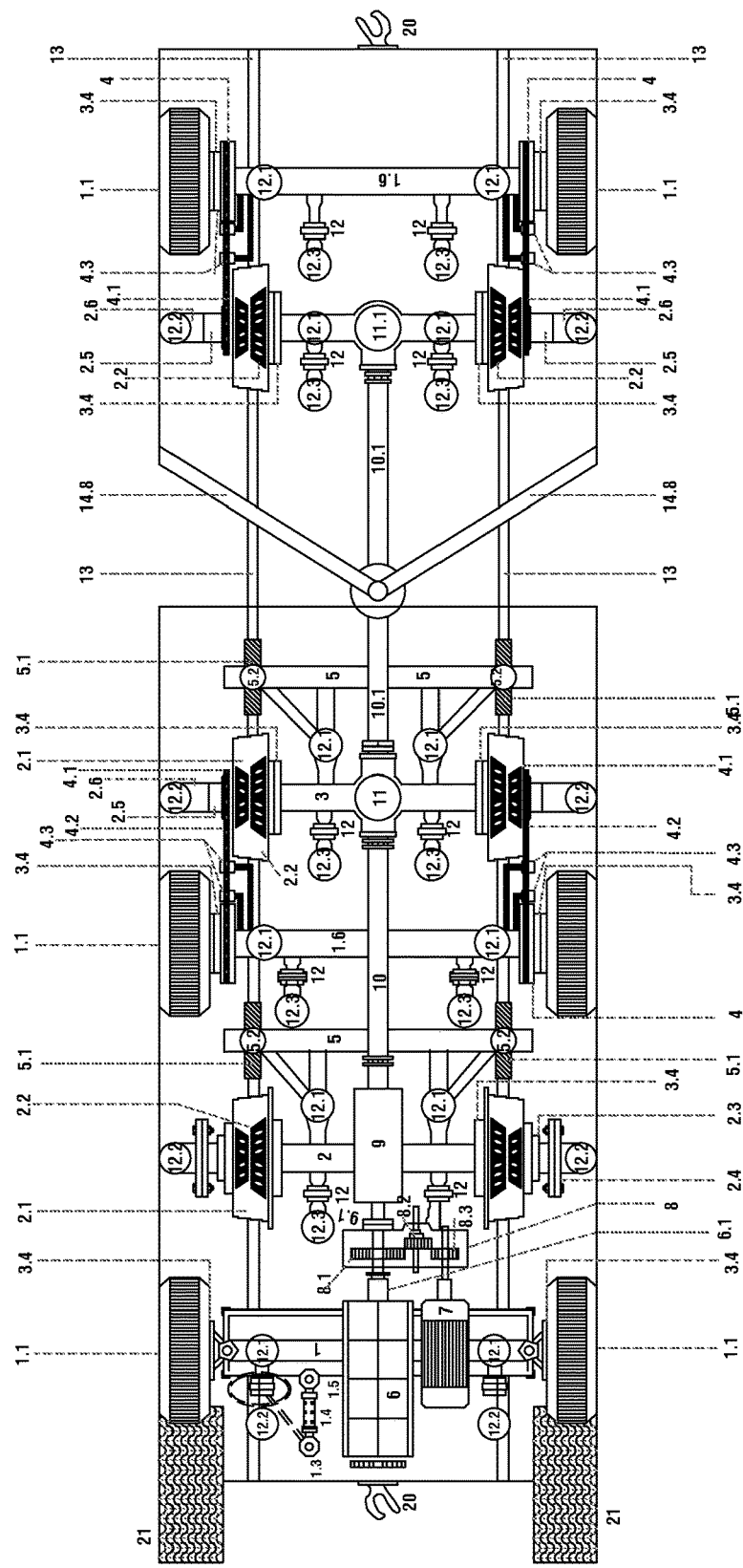
FIG. 2 depicts a top view of a Rail cum road vehicle, according to an embodiment.
Figure 3:
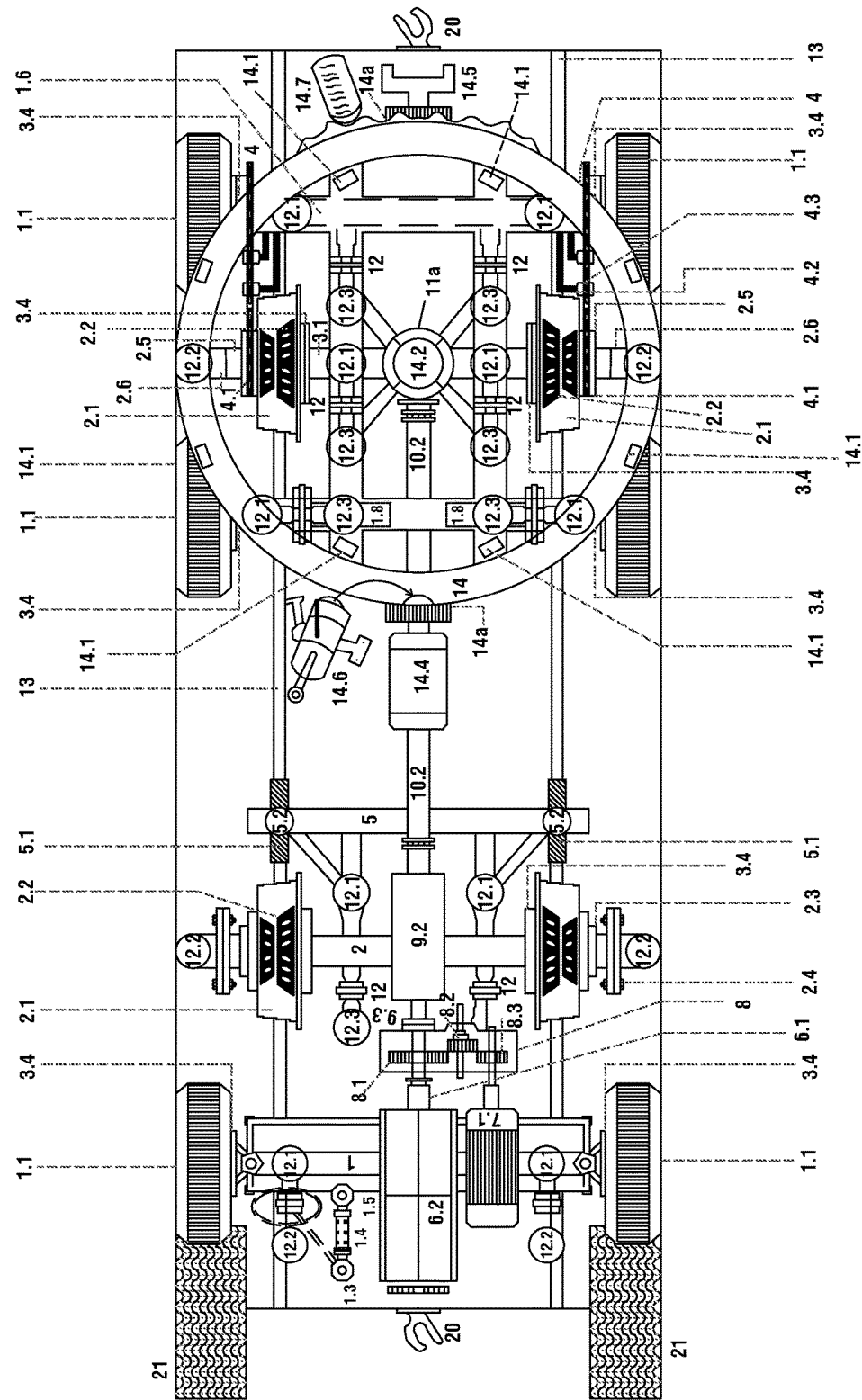
FIG. 3 depicts a top view of a Rail cum road vehicle, according to an embodiment.

But in crowned hollow axle, as shown in FIGS. 1-3, flanged steel wheels are fitted with drive axle on both sides. An end flange with holes and studs is firmly bolted to the outer side of flanged steel wheel. A long shaft with holed flange fitted with roller bearing at its outer end 2.5 is tightened with nuts to the studs of axle's end flange. A square block with round bore 2.6 matching the outer diameter of the end bearing of 2.5 is firmly fitted over the end bearing. To keep the bearing and the square block in position, a bolt with washer is tightened into the threaded hole at shaft end. An air bag 12.2 and shock absorbers are fitted on the square block 2.6 connecting the axle top with super structure chassis. In prior arts, only two air bags are fitted. But in the present invention, mostly, 4 air bags are fitted on the axle of steel wheels for more safety and comfort at tight curves by maintaining better center of gravity even at high speed.

For all RCRV rolling stock, the overall diameter of the flange of steel wheel is increased by 10 millimeters than the flange diameter of wheels of global railways, for safety purpose while RCRVs running fast through up gradient to down gradient rail tracks constructed on the existing roadways. The overall weight of steel wheel is reduced to bear the reduced maximum axle load capacity of 17.5 tons.

As shown in the FIGURES, a steel frame 5 of rail track brake system, gets its support from the respective extended axle arm 12.1 of axle 2 and axle 3 of steel wheels. A rail track brake shoe 5.1, is connected to its overhead air bag 5.2 through solid pistons of a double-cylinder block fitted in frame 5. To apply efficient direct braking on rail, the air bag 5.2 is inflated to push the double piston downwards to enable the brake shoe to grip the rail and by deflating, the brake shoe moves upwards. The purpose of fitting double shafts is to prevent lateral movements of the brake shoe. This rail track brake system differs in its design from the prior arts and its weight is also lighter compared to its prior arts. This braking system is most essential for emergency braking.

As shown in FIGS. 1-2, a gas engine 6 fueled by L.P.G/C.N.G./L.N.G./diesel and a generator/motor 7 are both fitted adjacent at front end of the vehicle and both are connected to a LINK GEAR BOX 8 via inner grooved coupler with guide for gear rod 6.1, shown hidden, to a primary gear 8.1 and another grooved coupler without guide of the generator/motor to a 8.3 gear. This Link Gear Box with 3 gears plays an important role during regenerative braking. The main gear 8.1 is connected to a main gear box 9 by a universal coupling 9.1. A middle gear 8.2 is a sliding idle gear which, during regenerative braking, the driver engage it to both the gears 8.1 and 8.3 so that the generator 7 runs and the electricity produced is stored in batteries kept on the roof (not shown). The stored power is used to run the vehicle or the motor of air compressor unit kept nearby on the roof, which are not shown in the drawing. The existing hybrid roadways vehicles produce much less power by regenerative braking because of enormous rubber tire friction on road surface, whereas R.C.R. vehicles produce multi times more power because their steel wheels on rails runs freely much longer distance without any friction, even when the driver switched off the engine.

As shown in FIG. 1-2, the main gear box 9 with auto transmission is used to attain continuous speed pick up without any jerk. Its engine power is transmitted via link gear box 8 and main gear box 9 to crowns/differential boxes 11 and 11.1 of the hollow axles 3 and 3.1 respectively. Power drive axles inside these hollow axles transmit power from the crowns to its steel wheels. The steel wheels further transmit their drive to their adjoining rubber wheels 1.1 of 3rd axle 1.6 and 7th axle 1.6 by means of sprockets 4 and 4.1 and heavy chain 4.2. The tension of chain is maintained by spring loaded mini sprockets 4.3 at top and bottom supported by arms extended from top and bottom of the axles. Since the diameter of steel wheels is smaller than that of rubber wheels and in order to synchronize the distances covered by both the steel and rubber wheels, appropriate size sprockets are fitted to both steel and rubber wheels. To accommodate space for sprockets and chains on both sides, care should be taken in selecting rubber wheels as the 4 pairs of rubber wheels should also bear the vehicle load while moving over a short distance on roadways.

The purpose of fitting FLANGE-LESS steel wheels 3.5 and rubber wheels 1.1, in between two flanged steel wheel axles as shown in FIG. 1 is to prevent jumping of the middle flanged steel wheels over the rails at tight curves and also to increase hauling capacity of engine.

As shown in the FIGURES, a CIRCULAR BOGIE 14 at rear of the vehicle is different from the prior arts which has double or triple-axle bogies. In this bogie, the single crowned axle 3.1 with flanged steel wheels 2.1 in the middle of the circular bogie is balanced by 4 rubber wheels on its both sides with their axles 1.6 and 1.8. The 1.8 axle is a split axle fitted to provide space/accommodate the propeller shaft, availing the limited space under the circular bogie. Since the total weight of the entire circular bogie is much less when comparing to that of prior arts, it forms part and parcel of any RCRV. For smooth movement of body frame over the circular bogie, 8 nos. of steel rollers 14.1 are fitted around the circular bogie on its top. Its center plate 14.2, in which another center plate 14.3 with heavy stud fitted under the rear of the super structure/the main chassis will perfectly sit into it and then the stud is tightened with heavy washer and nut underneath circular bogie, so that it allows lateral movement of the main chassis on rails by about an angle of 35 degrees on both sides. Thus the single axle steel wheel bogie facilitates the vehicle to comfortably run faster on rails even at tight curves.

As shown in the FIGURES, the circular bogie 14 has racks 14a, not shown in the drawings, to suit pinions, are fitted beneath its front and rear. A motorized pinion 14.4 at front middle bottom of 14 and another bare pinion 14.5 at its rear middle bottom are fitted to its super structure after keeping the pinion perfectly engaged with their respective racks. These two pinions along with the center plate bolt and nut keep the circular chassis under their hold. As shown in FIG. 1, a heavy spring loaded lock 14.6 is actually fitted just above the motorized pinion. A taper hole at the front middle side wall of the circular chassis just above the motorized pinion is provided to enable perfect locking of the circular chassis only while running on plain roads. Also the driver on plain roads can lock or unlock by operating the lock lever. But while running on rails, it should be kept unlocked by inserting the spring loaded hooked pin into the lock hole by pulling back the lock roller pin. Also a signal in the driver's cabin will indicate the lock position. At rear, just above the bare pinion, one heavy spring loaded ball stopper 14.7 is provided to avoid vibrations of circular chassis while on move.

All Rail Cum Road Vehicles of the FIGURES, are provided with air suspension system and shock absorbers for maximum comforts. A hanger bracket 12 for axle arm with load bearing air bag 12.1 and another axle lift air bag 12.3 just behind hanger bracket are provided to all axles. To lift any of the axles, the axle lifting air bag 12.3 inflates while simultaneously the load bearing air bag deflates to achieve the purpose, with the help of air transfer valves without wasting high pressure air. The air valves are not shown in the drawings. The same function is applied to inflate or/and deflate all left side or right side air bags to enable Rail Cum Road train to run fast even at tight curves by maintaining its center of gravity.

A center buffer coupling 20 is provided at both ends of all vehicles to enable the engine to pull several numbers of passenger or goods vehicles on the combined rail and corrugated concrete track 21 or RCRV track. Brake assemblies 3.4 are mounted to all steel and rubber wheels.

Second Embodiment

FIG. 2 is a second embodiment of the present invention of Rail Cum Road Vehicle being an Articulate Hybrid Engine Coach. Like FIG. 1, it is also an independent prime mover on rails or on all roadways. It has 3 pairs of rubber wheels 1.1 and 3 pairs of flanged steel wheels 2.1.

Figure 4:
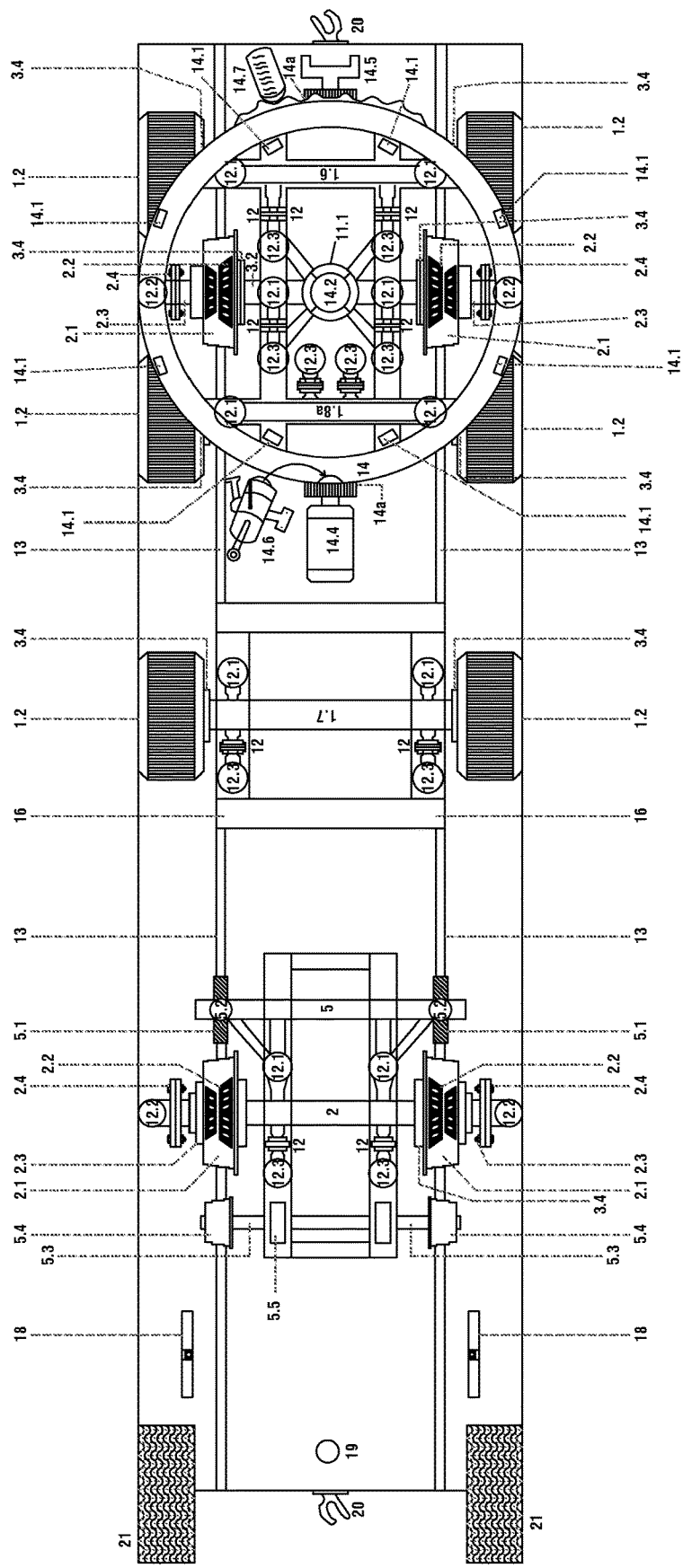
FIG. 4 depicts a top view of a Rail cum road vehicle, according to an embodiment.

As shown in the FIG. 4, a solid axle 1 is a front axle with rubber wheels 1.1 and controlled by steering wheel 1.2 and pinion 1.3 which is connected to steering end arm 1.4 and fitted to the tie rod 1.5.

As shown in the FIGURES, in solid axle 2, flanged steel wheels 2.1 with taper roller bearings 2.2 are fitted with the support of threaded bush with multiple holed end flange 2.3 to hold steel wheel 2.1. To prevent loosening or tightening of the threaded bush 2.3 over the solid axle, a multiple holed flanged square block with square hole 2.4 matching the axle's square end is fitted and bolted to the flange of the threaded bush 2.3. This square block also hold the air bag 12.2 on it at solid steel wheel axle's both the ends to support its super structure, the main chassis.

But in crowned hollow axle, as shown in the FIGS. 1-3, flanged steel wheels are fitted with drive axle on both sides. An end flange with holes and studs is firmly bolted to the outer side of flanged steel wheel. A long shaft with holed flange fitted with roller bearing at its outer end 2.5 is tightened with nuts to the studs of axle's end flange. A square block with round bore 2.6 matching the outer diameter of the end bearing of 2.5 is firmly fitted over end bearing. To keep the bearing and the square block in position, a bolt with washer is tightened into the threaded hole at shaft end. An air bag 12.2 and shock absorbers are fitted on the square block 2.6 connecting the axle top with super structure chassis. In prior arts only two air bags are fitted. But in the present invention, mostly, 4 air bags are fitted on the axle of steel wheels for more safety and comfort even at high speed better maintaining center of gravity at tight curves.

In all RCRV rolling stock of the FIGURES, the overall diameter of the flange of steel wheel is increased by 10 millimeters than the flange diameter of global railways, for safety purpose while RCRVs running fast through up gradient to down gradient rail tracks constructed on the existing roadways. The overall weight of steel wheel is reduced to bear the reduced maximum axle load capacity of 17.5 tons.

As shown in the FIGURES, a steel frame 5 of rail track brake system, gets its support from the respective extended axle arm 12.1 of axle 2 and axle 3 of steel wheels. A rail track brake shoe 5.1, is connected to its overhead air bag 5.2 through solid pistons of a double-cylinder block fitted in frame 5. To apply efficient direct braking on rail, the air bag 5.2 is inflated to push the double piston downwards to enable the brake shoe to grip the rail and by deflating, the brake shoe moves upwards. The purpose of fitting double shafts is to prevent lateral movements of the brake shoe. This rail track brake system differs in its design from the prior arts and its weight is also lighter compared to its prior arts. This braking system is most essential for emergency braking.

As shown in the FIGURES, a gas engine 6 fueled by L.P.G/C.N.G./L.N.G./diesel and a generator/motor 7 are both fitted adjacent at the front end of the vehicle and both are connected to a Link Gear Box 8 via inner grooved coupler with guide for gear rod 6.1 (shown hidden) to a primary gear 8.1 and another grooved coupler without guide of the generator/motor to a 8.3 gear. This Link Gear Box with 3 gears plays an important role during regenerative braking. The main gear 8.1 is connected to a main gear box 9 by a universal coupling 9.1. A middle gear 8.2 is a sliding idle gear which, during regenerative braking, is engaged by the driver to both the gears 8.1 and 8.3 so that the generator 7 runs and the electricity produced is stored in batteries kept on the roof (not shown). The stored power is used to run the vehicle or the motor of air compressor unit kept nearby on the roof, which are not shown in the drawing. The existing hybrid roadways vehicles produce much less power by regenerative braking because of enormous rubber tire friction on road surface, whereas R.C.R. vehicles produce multi times more power because their steel wheels on rails runs freely much longer distance without any friction, even when the driver switched off the engine.

As shown in the FIGURES, the main gear box 9 with auto transmission is used to attain continuous speed pick up without any jerk. Its engine power is transmitted via link gear box 8 and main gear box 9 to crowns/differential boxes 11 and 11.1 of the hollow axles 3 and 3.1 respectively. Power drive axles inside these hollow axles transmit power from the crowns to its steel wheels. These steel wheels further transmit their drive to their adjoining rubber wheels 1.1 of 3rd axle 1.6 and 6th axle 1.6 by means of sprockets 4 and 4.1 and heavy chain 4.2. The tension of chain is maintained by spring loaded mini sprockets 4.3 at top and bottom supported by arms extended from top and bottom of the axles. Since the diameter of steel wheels is smaller than that of rubber wheels and in order to synchronize the distances covered by both the steel and rubber wheels, appropriate size sprockets are fitted to both steel and rubber wheels. To accommodate space for sprockets and chains on both sides, care should be taken in selecting rubber wheels as the 4 pairs of rubber wheels should also bear the vehicle load while moving over a short distance on roadways.

All R.C.R. rolling stock of the FIGURES are provided with air suspension system and shock absorbers for maximum comforts. The hanger bracket 12 for axle arm with load bearing air bag 12.1 and another axle lift air bag 12.3 just behind hanger bracket are provided to all the axles. To lift any of the axles, the axle lifting air bag 12.3 inflates while simultaneously the load bearing air bag deflates to achieve the purpose, with the help of air transfer valves without wasting high pressure air. The air valves are not shown in the drawings. The same function is applied to inflate or/and deflate all left side or right side air bags to enable Rail Cum Road train to run fast even at tight curves by maintaining its center of gravity. A center buffer coupling 20 is provided at both ends of all vehicles to enable the engine to pull several numbers of passenger or goods vehicles on the combined rail and corrugated concrete track/RCRV track 21. Brake assemblies 3.4 are mounted to all steel and rubber wheels.

At the center point of the cross bar of the chassis at the end of 4th axle, an articulate chassis 14.8 is fitted wherein the crowned axle 11.1 with flanged steel wheel drive connected to its rear rubber wheels 1.1 of axle 1.6 by means of sprockets and chains as explained above. A propeller shaft 10.1 with its universal joints at its both ends enables the crown axle 11.1 under the articulate chassis to function perfectly even at tight curves on rail track.

Third Embodiment

FIG. 3 is the plan view of third embodiment of the present invention of rail cum road vehicles being a Mini Hybrid Engine Coach. This can be used as fast trams. On rail it can haul 3 or 4 passenger or goods vehicles. It has 3 pairs of rubber wheels 1.1 and 2 pairs of flanged steel wheels 2.1.

As shown in the FIGURES, a solid axle 1 is the front axle with rubber wheels 1.1 and controlled by steering wheel 1.2 and pinion 1.3 which is connected to steering end arm 1.4 and fitted to the tie rod 1.5.

As shown in the FIGURES, in its solid axle 2, flanged steel wheels 2.1 with taper roller bearings 2.2 are fitted with the support of threaded bush with multiple holed end flange 2.3 to hold steel wheel 2.1. To prevent loosening or tightening of the threaded bush 2.3 over the solid axle, a multiple holed flanged square block with square hole 2.4 matching the axle's square end is fitted and bolted to the flange of the threaded bush 2.3. This square block also hold the air bag 12.2 on it at solid steel wheel axle's both the ends to support its super structure, the main chassis.

In all RCRV rolling stock, the overall diameter of the flange of steel wheel is increased by 10 millimeters than the flange diameter of wheels of global railways, for safety purpose while RCRVs running fast through up gradient to down gradient rail tracks. The overall weight of steel wheel is reduced to bear the reduced maximum axle load capacity of 17.5 tons.

As shown in the FIGURES, a steel frame 5 of rail track brake system, gets its support from the respective extended axle arm 12.1 of axle 2 and axle 3 of steel wheels. A rail track brake shoe 5.1, is connected to its overhead air bag 5.2 through solid pistons of a double-cylinder block fitted in frame 5. To apply efficient direct braking on rail, the air bag 5.2 is inflated to push the double piston downwards to enable the brake shoe to grip the rail and by deflating, the brake shoe moves upwards. The purpose of fitting double shafts is to prevent lateral movements of the brake shoe. This rail track brake system differs in its design from the prior arts and its weight is also lighter compared to its prior arts. This braking system is most essential for emergency braking.

As shown in FIG. 3, a lower capacity gas engine 6.2 fueled by L.P.G/C.N.G./L.N.G./diesel and a generator/motor 7.1 are both fitted adjacent at the front end of the FIG. 3 and both are connected to a Link Gear Box 8 via 'inner grooved coupler with guide for gear rod 6.1, shown hidden, to a primary gear 8.1 and another grooved coupler without guide of the generator/motor to a 8.3 gear. This Link Gear Box with 3 gears plays an important role during regenerative braking. The main gear 8.1 is connected to a main gear box 9.2 by a universal coupling 9.3. A middle gear 8.2 is a sliding idle gear which, during regenerative braking is engaged by the driver to both the gears 8.1 and 8.3 so that the generator 7.1 runs and the electricity produced is stored in batteries kept on the roof, not shown. The stored power is used to run the vehicle or the motor of air compressor unit kept nearby on the roof, which are not shown in the drawing. The existing hybrid roadways vehicles produce much less power by regenerative braking because of enormous rubber tire friction on road surface, whereas R.C.R. vehicles produce multi times more power because their steel wheels on rails runs freely much longer distance without any friction, even when the driver switched off the engine.

As shown in FIG. 3, the main gear box 9.2 with auto transmission suitable to lower capacity engine is used to attain continuous speed pick up without any jerk. Its engine power is transmitted via link gear box 8 and main gear box 9.2 to a crown/differential box 11a, shown hidden, of hollow axle 3.1 under circular chassis. Power drive axles inside this hollow axle transmit power from the crown to its steel wheels. These steel wheels further transmit their drive to their adjoining rear rubber wheels 1.1 of axle 1.6 by means of sprockets 4 and 4.1 and heavy chain 4.2. The tension of chain is maintained by spring loaded mini sprockets 4.3 at top and bottom supported by arms extended from top and bottom of the axle.

As shown in the FIGURES, in crowned hollow axle, flanged steel wheels are fitted with drive axle on both sides. An end flange with holes and studs is firmly bolted to the outer side of flanged steel wheel. A long shaft fitted with holed flange fitted with roller bearing at its outer end 2.5 is tightened with nuts to the studs of axle's end flange. A square block with round bore 2.6 matching the outer diameter of the end bearing of 2.5 is firmly fitted over end bearing. To keep the bearing and the square block in position, a bolt with washer is tightened into the threaded hole at shaft end. An air bag 12.2 and shock absorbers are fitted on the square block 2.6 connecting the axle top with super structure/chassis. In prior arts only two air bags are fitted. But in the present invention, mostly, 4 air bags are fitted on the axle of steel wheels for more safety and comfort even at high speed better maintaining its center of gravity at tight curves.

Since the diameter of steel wheels is smaller than that of rubber wheels and in order to synchronize the distances covered by both the steel and rubber wheels, appropriate size sprockets are fitted to both steel and rubber wheels. To accommodate space for sprockets and chains on both sides, care should be taken in selecting rubber wheels as the 3 pairs of rubber wheels should also bear the vehicle load while moving over a short distance on roadways.

As shown in the FIGURES, a circular bogie 14 at the rear of a road cum rail vehicle is different from the prior arts which has double or triple-axle bogies. In this bogie, a single crowned axle 3.1 with flanged steel wheels 2.1 in the middle of the circular bogie is balanced by 4 rubber wheels on its both sides with their axles 1.6 and 1.8. The 1.8 axle is a split axle fitted to provide space/accommodate the propeller shaft, availing the limited space under the circular bogie. Since the total weight of the entire circular bogie is much less when comparing to that of prior arts, it forms part and parcel of any R.C.R.V. For smooth movement of main chassis over the circular bogie, 8 nos. of steel rollers 14.1 are fitted around the circular bogie on its top. Its center plate 14.2, in which another center plate 14.3 with heavy stud fitted under the rear of the main chassis/super structure, will perfectly sit into it and then the stud is tightened with heavy washer and nut underneath circular bogie, so that it allows lateral movement of main chassis on rails by about an angle of 35 degrees on both sides. Thus a single axle steel wheel bogie facilitates the vehicle to comfortably run faster on rails even at tight curves.

As shown in the FIGURES, the circular bogie 14 has racks 14a to engage with pinions, fitted beneath its front and rear, not shown in the drawing. A motorized pinion 14.4 at its front middle bottom and another bare pinion 14.5 at its rear middle bottom are fitted to its super structure after keeping the pinions perfectly engaged with their respective racks 14a. These two pinions along with the center plate bolt and nut keep the circular chassis in position under their hold. A heavy spring loaded locking devise 14.6 is actually fitted just above the motorized pinion. A taper hole at the front middle side wall of the circular chassis just above the motorized pinion is provided to enable perfect locking of the circular chassis only while running on plain roads. Also the driver on plain roads can lock or unlock by operating the lock lever. But while running on rails, it must be kept unlocked by inserting the spring loaded hooked pin into the lock hole in the devise by pulling back the lock lever. Also a signal in the driver's cabin will indicate lock position. At rear, just above the bare pinion, one heavy spring loaded ball stopper 14.7 is provided to avoid vibrations of circular chassis while on move.

All RCRV rolling stock, as shown in the FIGURES, are provided with air suspension system and shock absorbers for maximum comforts. The hanger bracket 12 for axle arm with load bearing air bag 12.1 and another axle lift air bag 12.3 just behind hanger bracket are provided to all the axles. To lift any of the axles, the axle lifting air bag 12.3 inflates while simultaneously the load bearing air bag deflates to achieve the purpose, with the help of air transfer valves without wasting high pressure air. The air valves are not shown in the drawings. The same function is applied to inflate or/and deflate all left side or right side air bags to enable Rail Cum Road train to run fast even at tight curves by maintaining its center of gravity. A center buffer coupling 20 is provided at both ends of all vehicles to enable the engine to pull several numbers of passenger or goods vehicles on the combined rail and corrugated concrete track 21 or RCRV track. Brake assemblies 3.4 are mounted to all steel and rubber wheels.

Fourth Embodiment

FIG. 4 is a fourth embodiment of the present invention of rail cum road vehicles being a Multi—Purpose Trailer Cum Semi-Trailer for safe, fast and eco-friendly mass transporting of all sorts of freight on RCRV tracks laid on all roadways. While moving on rails it is a trailer. But while on roadways it is a semi-trailer. It can also be used as passenger coach by constructing passenger coach body over it. Hybrid engine coaches referred in the FIGURES shall easily pull and push plurality of these Trailer Cum Semi-Trailers on RCRV tracks from front and rear of a train from the point of origin to a far away destination point. This is to replace the present highly polluting, most unsafe and slow moving roadways semi-trailers and trucks.

After reaching the destination point, heavy tractors are used to tow away all trailer cum semi-trailers from rail track to move on roadways to unload the freight at delivery points. To bear heavy load, all the six rubber tires are super single wider width rubber tires 1.2. Among all the R.C.R. Rolling Stock, only the FIG. 4 would maximum use its circular bogie on roadways because this circular bogie, while moving on narrow roads, sharp curves, hair pin bends and also while parking, it functions like rear steering controlled by its motorized pinion and rack, as per its driver's option.

As shown in FIG. 4, at its front side, under its main chassis/super structure, a king pin 19 is provided for the purpose of coupling with a towing vehicle/heavy roadways tractor to pull it away from RCRV track or to place it on RCRV track at terminal points. Next to it, is a landing gear/telescopic leg 18. Next to it, is a steel frame 17, under which, at its middle, as shown in the FIGURES, a solid axle 2, flanged steel wheels 2.1 with taper roller bearings 2.2 are fitted with a support of threaded bush with multiple holed end flange 2.3 to hold steel wheel 2.1. To prevent loosening or tightening of the threaded bush 2.3 over the solid axle, a multiple holed flanged square block with square hole 2.4 matching the axle's square end is fitted and bolted to the flange of the threaded bush 2.3. This square block also hold an air bag 12.2 at axle's both the ends to support its super structure, the main chassis.

As shown in the FIGURES, behind the above solid axle 2, a steel frame 5 of rail track brake system, gets its support from an extended axle arm 12.1 of axle 2 of steel wheels. Hanger brackets 12, air bags 12.1 and 12.3 are fitted to lift or lower the axle. A rail track brake shoe 5.1, is connected to its overhead air bag 5.2 through solid pistons of a double-cylinder block fitted in frame 5. To apply efficient direct braking on rail, the air bag 5.2 is inflated to push the double piston downwards to enable the brake shoe to grip the rail and by deflating, the brake shoe moves upwards. The purpose of fitting double shafts is to prevent lateral movements of the brake shoe. This rail track brake system differs in its design from the prior arts and its weight is also lighter compared to its prior arts. This braking system is most essential for emergency braking.

As shown in FIG. 4, at front side of the steel frame 17, one pair of mini flanged dummy steel wheels 5.4 are fitted under a telescopic frame 5.5, shown hidden. Since this complete set in frame 17 is lesser in weight, it can always remain with the trailer itself even while moving on plain roads hauled by a tractor. If necessary it can also be detached at the terminus after completing rail journey. The mini flanged dummy steel wheels would be useful to easily move the frame 17 while detaching it from or fitting it to FIG. 4.

In between a circular bogie 14 and steel frame 17, a steel frame 16 with axle 1.7 with a pair of super single wider width rubber tires 1.2 along with hanger brackets 12, air bags 12.1 and 12.3 are fitted under the main chassis of FIG. 4. These two rubber wheels can be kept lifted up to prevent their unnecessary wear and tear during no-load running on roadways; The complete set of this steel frame 16 can also be detached whenever necessary. Instead of using 4 numbers of conventional rubber wheels per rear axle, to save space, 2 numbers of super single wider width rubber wheels per rear axle can bear the entire load of the trailer cum semi-trailer.

The circular bogie 14 at the rear of FIG. 4 is different from the prior arts which have double or triple-axle bogies. In the middle of this bogie, as shown in FIGURES, a single axle 3.2 along with hanger bracket 12, air bags 12.1 and 12.3 and flanged steel wheels 2.1 with taper roller bearings 2.2 are fitted with a support of threaded bush with multiple holed end flange 2.3 to hold steel wheel 2.1. To prevent loosening or tightening of the threaded bush 2.3 over the solid axle, a multiple holed flanged square block with square hole 2.4 matching the axle's square end is fitted and bolted to the flange of the threaded bush 2.3. This square block also hold an air bag 12.2 at axle's both the ends to support the circular bogie. This solid axle 3.2 is balanced by 4 rubber wheels on its both sides with their axles 1.6 and 1.8*a*. The 1.8*a* is full solid axle as there is no interference of propeller shaft in this FIG. 4. For smooth movement of super structure/main chassis over the circular bogie, 8 nos. of steel rollers 14.1 are fitted around the circular bogie on its top. Its center plate 14.2, in which another center plate 14.3 with heavy stud fitted under the rear of the body frame/super structure, will perfectly sit into it and then the stud is tightened with heavy washer and nut underneath circular bogie, so that it allows lateral movement of the body frame on rails by about an angle of 35 degrees on both sides. In between 14.2 and 14.3, a greased hard rubber is placed for the purpose of friction-free movement of its main chassis. Thus the single axle steel wheel bogie facilitates the vehicle to comfortably run faster on rails even at tight curves. Brake assemblies 3.4 with rubber and steel wheels are fitted at the ends of all axles.

As shown in the FIGURES, the circular bogie 14 has racks 14*a*, shown hidden, to engage with pinions, fitted beneath its front and rear, not shown in the drawing. A Motorized Pinion 14.4 at its front middle bottom and another bare pinion 14.5 at its rear middle bottom are fitted to its super structure after keeping the pinions perfectly engaged with their respective racks 14*a*. These two pinions along with the center plate bolt and nut keep the circular chassis in position under their hold. A heavy spring loaded locking devise 14.6 is actually fitted just above the motorized pinion. A taper hole at the front middle side wall of the circular chassis just above the motorized pinion is provided to enable perfect locking of the circular chassis only while running on plain roads. Also the driver on plain roads can lock or unlock by operating the lock lever. But while running on rails, it must be kept unlocked by inserting the spring loaded hooked pin into the lock hole in the devise by pulling back the lock lever. Also a signal in the driver's cabin will indicate lock position. At rear, just above the bare pinion, one heavy spring loaded ball stopper 14.7 is provided to avoid vibrations of circular chassis while on move.

To haul plurality of FIG. 4 by hybrid engine coach, all RCRVs are provided with center buffer couplers 20 at both ends of its super structure/heavy body chassis frame. Corrugated concrete track 21 on outer side of rails on both sides is laid for use by rubber wheels only for speed pick up at up-gradients, control speed at down gradients and for emergency braking only. During normal running, as all rubber wheels remain above the corrugated concrete track, enormous dangerous tire dust pollution is reduced. Brake assemblies 3.4 are mounted to all steel and rubber wheels.

Fifth Embodiment

Figure 5:
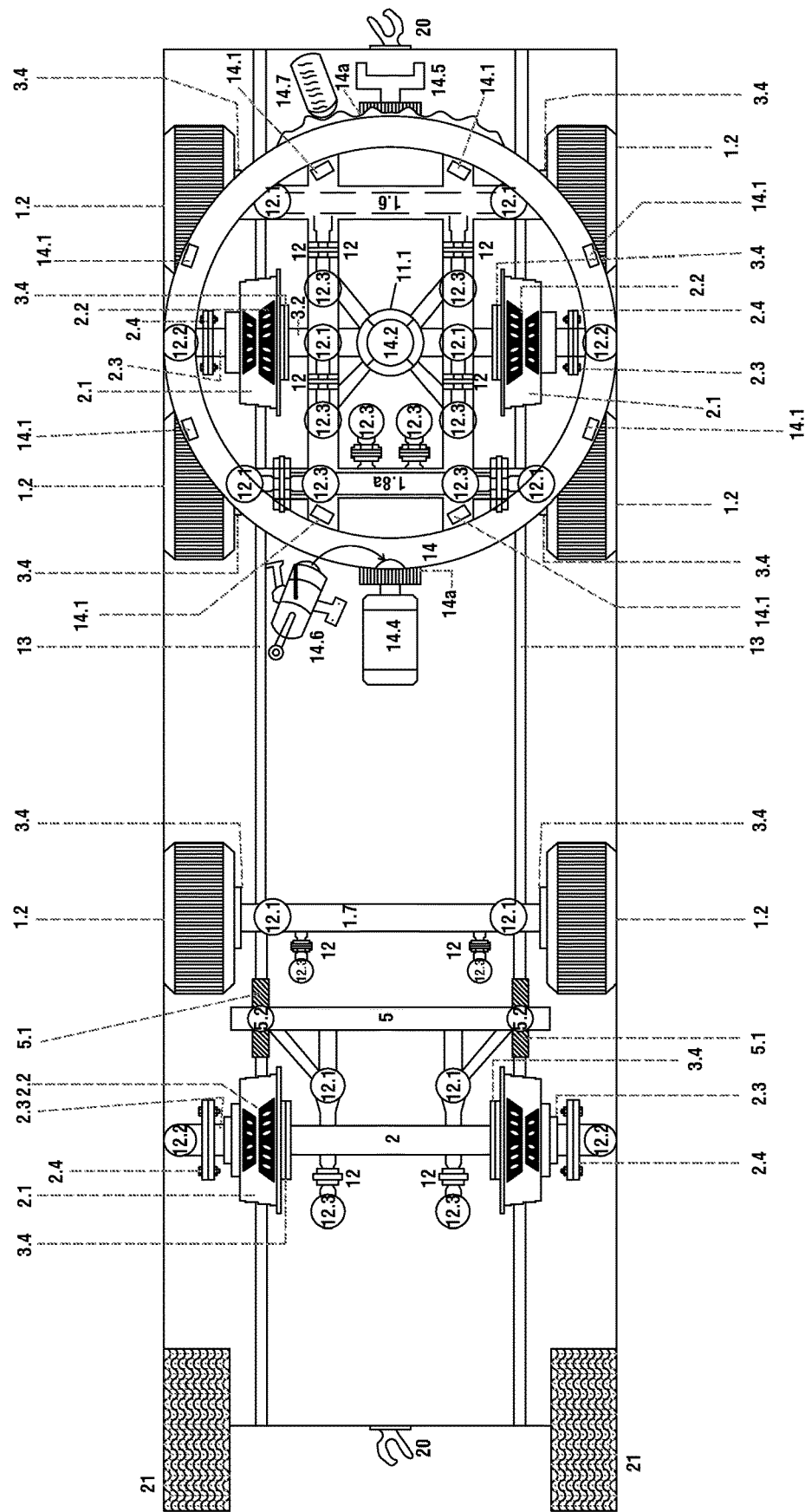
FIG. 5 depicts a top view of a Rail cum road vehicle, according to an embodiment.

FIG. 5 is a fifth embodiment of the present invention of rail cum road vehicle being a passenger coach. Normally the hybrid engine coach shown in the FIGURES and all passenger coaches will always remain on rail tracks. Only for maintenance/repair these may move out of rails for a short distance. As shown in the FIGURES, at its front side, on a solid axle 2, along with hanger brackets 12, air bags 12.1 and 12.3 flanged steel wheels 2.1 with taper roller bearings 2.2 are fitted with a support of a threaded bush with multiple holed end flange 2.3 to hold steel wheel 2.1. To prevent loosening or tightening of the threaded bush 2.3 over the solid axle, a multiple holed flanged square block with square hole 2.4 matching the axle's square end is fitted and bolted to the flange of the threaded bush 2.3. This square block also hold an air bag 12.2 at axle's both the ends to support its super structure, the main chassis.

As shown in the FIGURES, a steel frame 5 of rail track brake system, gets its support from an extended axle arm 12.1 of axle 2 of steel wheels. Hanger brackets 12, air bags 12.1 and 12.3 are fitted to lift or lower the axle. A rail track brake shoe 5.1, is connected to its overhead air bag 5.2 through solid pistons of a double-cylinder block fitted in frame 5. To apply efficient direct braking on rail, the air bag 5.2 is inflated to push the double piston downwards to enable the brake shoe to grip the rail and by deflating, the brake shoe moves upwards. The purpose of fitting double shafts is to prevent lateral movements of the brake shoe. This rail track brake system differs in its design from the prior arts and its weight is also lighter compared to its prior arts. This braking system is most essential for emergency braking.

Next is a solid axle 1.7 as shown in FIG. 5, fitted with rubber wheels 1.2, hanger brackets 12, load bearing air bags 12.1 and axle lifting air bags 12.3. As shown in the FIGURES, brake assemblies 3.4 are mounted to all steel and rubber wheels.

As shown in the FIGURES, at rear side of a circular bogie 14, on a single solid axle 3.2, under the circular bogie, along with hanger brackets 12, air bags 12.2 and 12.3, flanged steel wheels 2.1 with taper roller bearings 2.2 are fitted with a support of threaded bush with multiple holed end flange 2.3 to hold steel wheel 2.1. To prevent loosening or tightening of the threaded bush 2.3 over the solid axle, a multiple holed flanged square block with square hole 2.4 matching the axle's square end is fitted and bolted to the flange of the threaded bush 2.3. This square block also hold an air bag 12.2 at axle's both the ends to support the circular bogie. This solid axle 3.2 is balanced by 4 rubber wheels on its both sides with their axles 1.6 and 1.8a. The 1.8a is full solid axle as there is no interference of propeller shaft in this Passenger Coach, FIG. 5. For smooth movement of super structure/ main chassis over the circular bogie, 8 nos. of steel rollers 14.1 are fitted around the circular bogie on its top. Its center plate 14.2, in which another center plate 14.3 with heavy stud fitted under the rear of a super structure, the main chassis will perfectly sit into it and then the stud is tightened with heavy washer and nut underneath circular bogie, so that it allows lateral movement of the body frame on rails by about an angle of 35 degrees on both sides. In between 14.2 and 14.3, a greased hard rubber is placed for the purpose of friction-free movement of its main chassis. Thus the single axle steel wheel bogie with support of air bags 12.2 at its both sides facilitates the vehicle to comfortably run faster on rails better maintaining its center of gravity even at tight curves. Brake assemblies 3.4 with rubber and steel wheels are fitted at the ends of all axles.

The circular bogie 14, as shown in FIG. 5 has racks 14a, to engage with pinions, fitted beneath its front and rear, not shown in the drawing. A motorized pinion 14.4 at its front middle bottom and another bare pinion 14.5 at its rear middle bottom are fitted to its super structure after keeping the pinions perfectly engaged with their respective racks 14a. These two pinions along with the center plate bolt and nut keep the circular chassis in position under their hold. A heavy spring loaded locking devise 14.6 is actually fitted just above the motorized pinion. A taper hole at the front middle side wall of the circular chassis just above the motorized pinion is provided to enable perfect locking of the circular chassis only while running on plain roads. But while running on rails, it must be kept unlocked by inserting the spring loaded hooked pin into the lock hole in the devise by pulling back the lock lever. At rear, just above the bare pinion, one heavy spring loaded ball stopper 14.7 is provided to avoid vibrations of circular chassis while on move.

Sixth Embodiment

Figure 6:
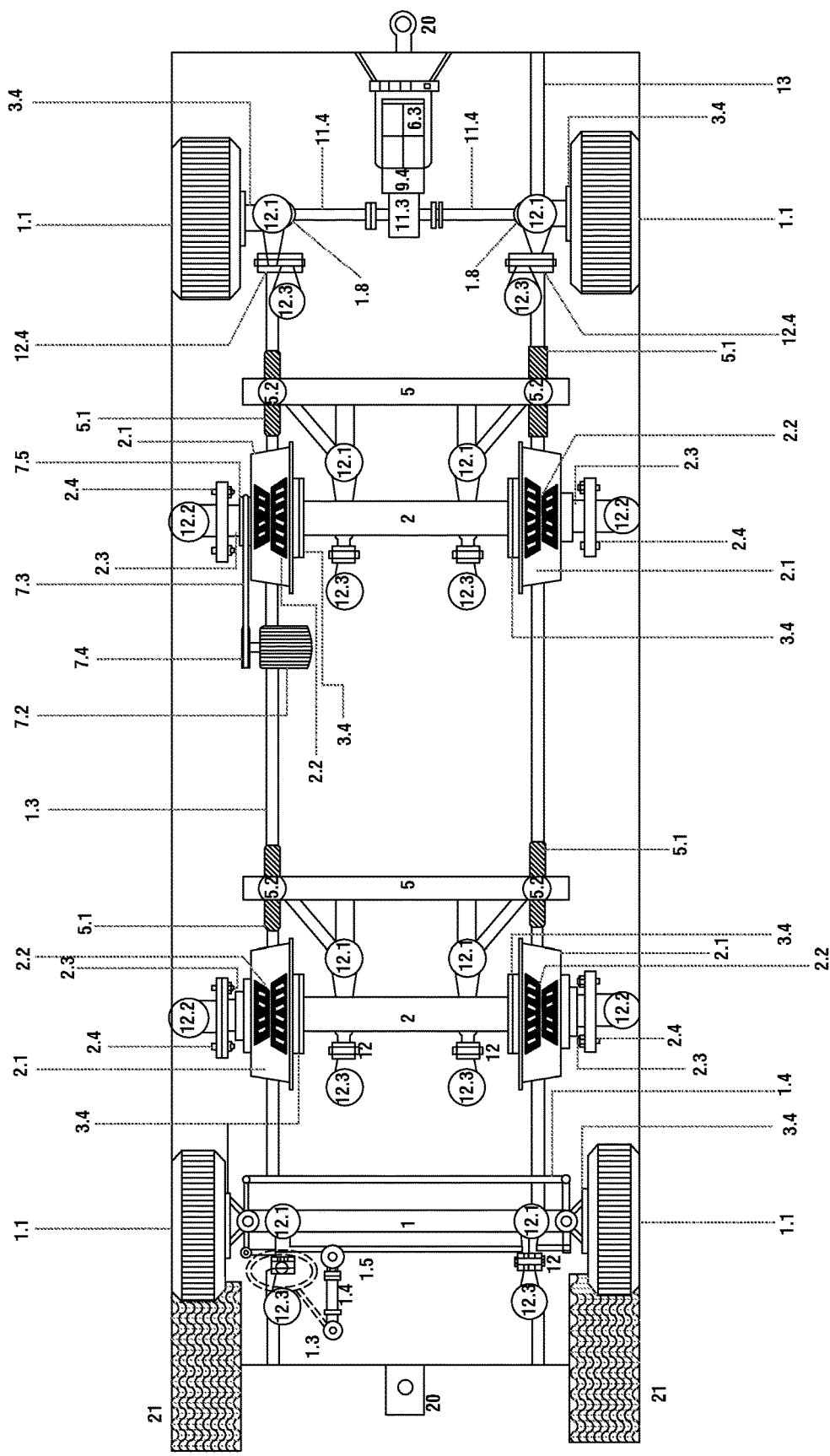
FIG. 6 depicts a top view of a Rail cum road vehicle, according to an embodiment.

FIG. 6 is a sixth embodiment of the present invention of rail cum road vehicles being a Rear Rubber Wheel Drive Caravan/Ambulance. It may also be a front wheel drive with front engine. In this vehicle, the circular bogie is not provided. An engine 6.3 and gear box 9.4 with crown 11.3 and the power drive axles 11.4 on its both sides drive the rear rubber wheels which is supported by wheel studs 1.8, shown hidden. Hanger brackets with extra width 12.4 bear the wheel studs on both sides. Instead of wheel studs other methods may also be contemplated. In the middle of this mid-size vehicle, as shown in the FIGURES, two solid axles 2 of flanged steel wheels with minimum wheel base are fitted, so that on rails these steel wheels will find no difficulty while passing through at tight curves. Flanged steel wheels 2.1 with taper roller bearings 2.2 are fitted with axle 2. A threaded bush with multiple holed end flange 2.3 is tightened to hold steel wheel 2.1. To prevent loosening or tightening of the threaded bush 2.3 over the solid axle, a multiple holed flanged square block with square hole 2.4 matching the axle's square end is fitted and bolted to the flange of the threaded bush 2.3. This square block also hold an air bag 12.2 at axle's both the ends to support its super structure, the main chassis.

As shown in the FIGURES, in FIG. 6 also, a steel frame 5 of rail track brake system, gets its support from an extended axle arm 12.1 of axle 2 of steel wheels. Hanger brackets 12, air bags 12.1 and 12.3 are fitted to lift or lower the axle. A rail track brake shoe 5.1, is connected to its overhead air bag 5.2 through solid pistons of a double-cylinder block fitted in frame 5. To apply efficient direct braking on rail, the air bag 5.2 is inflated to push the double piston downwards to enable the brake shoe to grip the rail and by deflating, the brake shoe moves upwards. The purpose of fitting double shafts is to prevent lateral movements of the brake shoe. This rail track brake system differs in its design from the prior arts and its weight is also lighter compared to its prior arts. This braking system is most essential for emergency braking.

At front of FIG. 6 an axle 1 with steerable rubber wheels 1.1 are fitted and controlled by steering wheel 1.2 and pinion 1.3 which is connected to steering end arm 1.4 and tied to the tie rod 1.5.

FIG. 6 caravan/ambulance is a light RCRV. The weight of its flanged steel wheel is minimized since its single axle's maximum load bearing capacity is less than 4 tons only. Therefore such super-fast ambulance on rails avoiding nightmarish road traffic jams and without making annoying noise of its siren will revolutionize patient care. It will save most of accident victims and sick patients as its standby medical staff can attend them providing timely first aid and fast reach hospital on time. The luxurious caravan is indeed a super-facility home away from home, will attract everyone particularly luxury car owners, middle class people and all foreign and local tourists. All tourists can save lot of time and money as they don't need a hotel stay.

Figure 7:
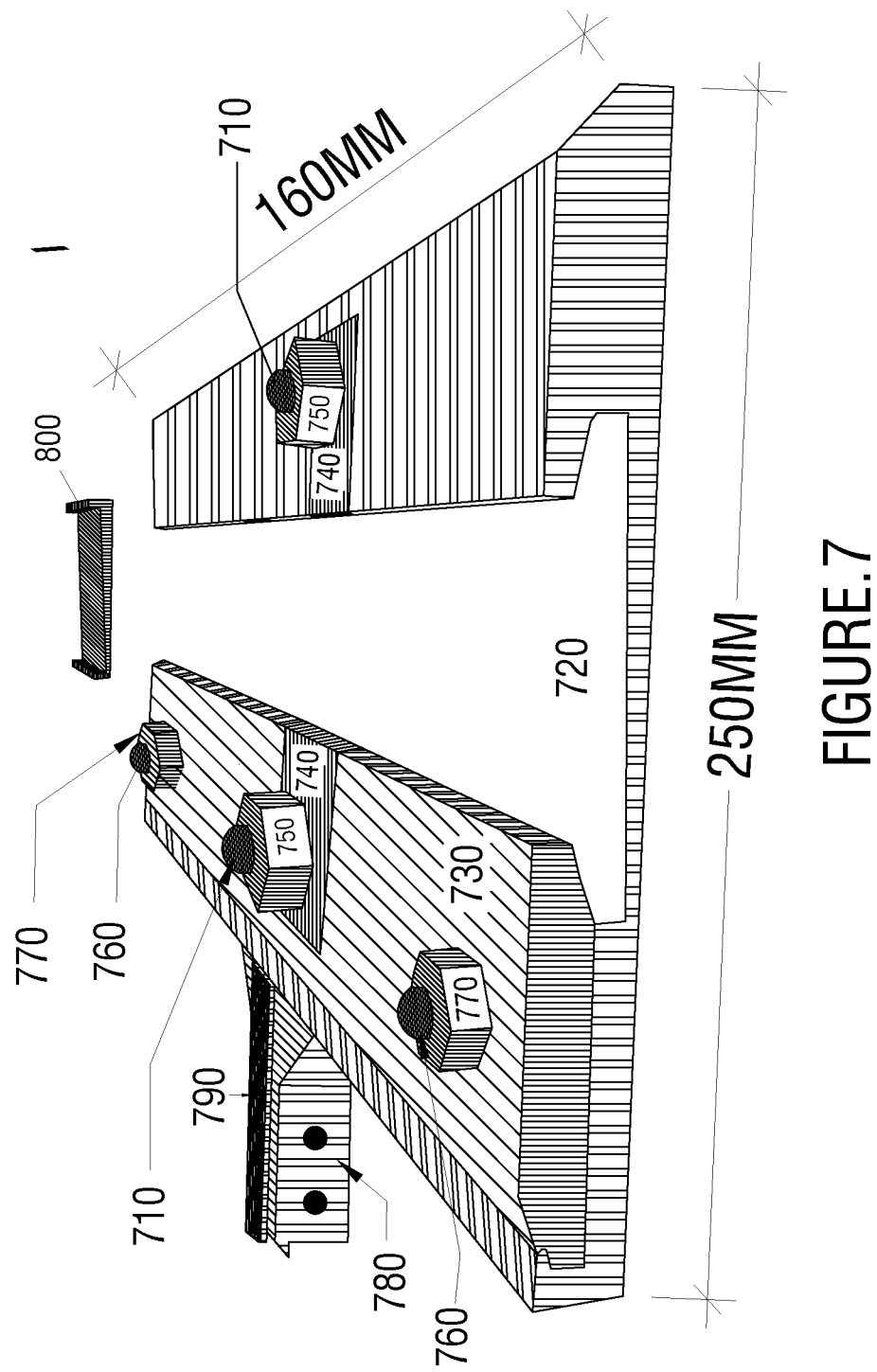
FIG. 7 depicts a bearing plate, according to an embodiment.
Figure 8:
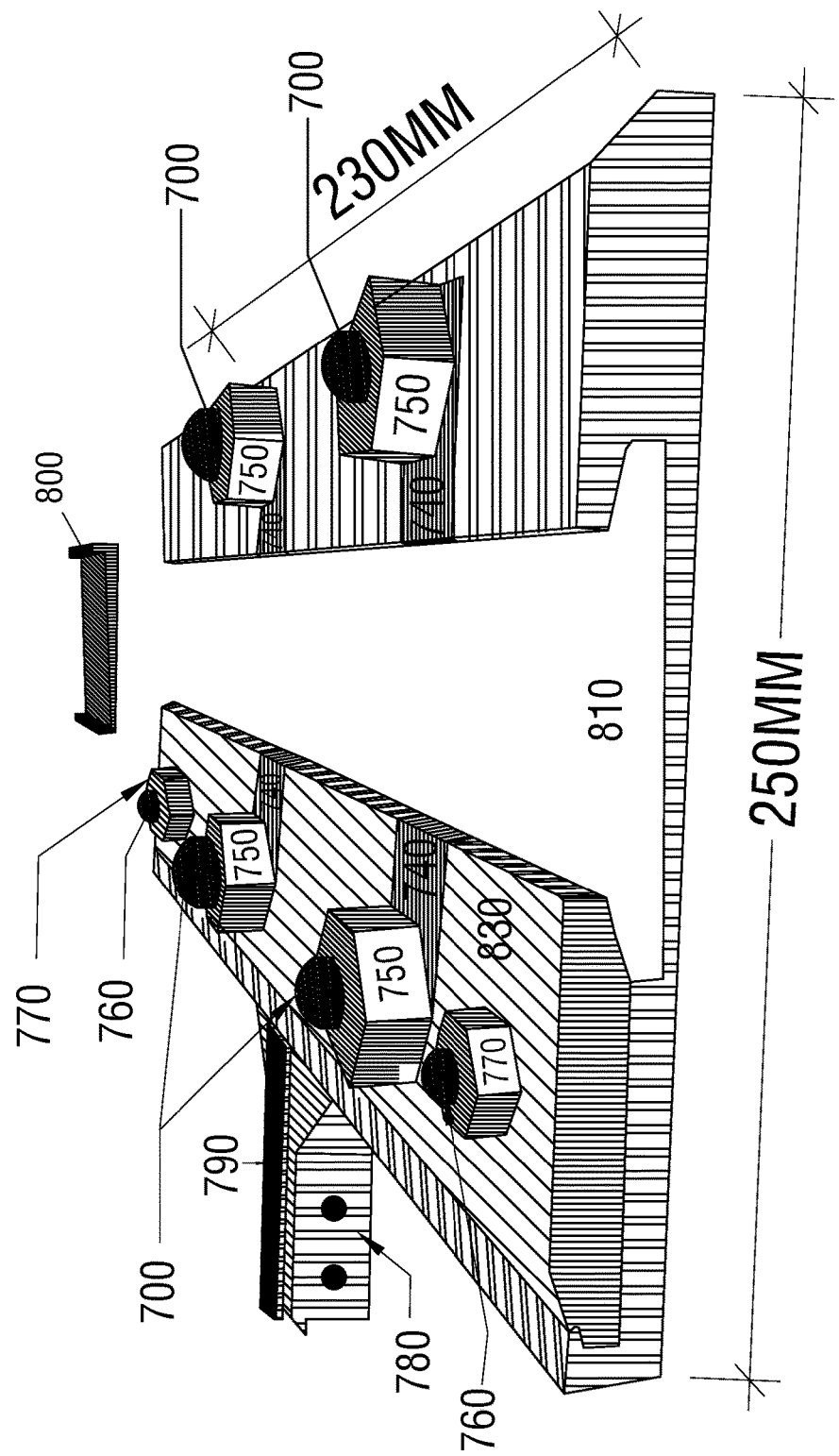
FIG. 8 depicts a bearing plate, according to an embodiment.

Economy Sleepers of Rail Track Cum Corrugated Concrete Track for Common Use of all the Above Six Embodiments of the Present Invention of Rail Cum Road Vehicles:

As shown in FIG. 7, a sleeper's double-jaw bearing plates at its both ends are provided to hold a rail and as shown in FIG. 8, another economy sleeper with its triple-jaw bearing plates are provided for use only at two rail joints for the present invention of rail cum road vehicle.

FIG. 7 is a plan view of an economy sleeper's bearing plate of the present invention of rail cum road vehicles. This bearing plate 720 has molded-double-jaw at its outer top side. It differs from the prior arts in its design, weight and material. Its width is about 160 mm and length is about 250 mm. According to the present invention, these sleepers are bolted to the hard road surface unlike the existing railways where their heavy concrete sleepers of about 1540 numbers per kilo meter are placed on thick layer of ballasts. Before bolting the economy sleeper's bearing plates to the ground by keeping one meter gap in between the sleepers or in other words only 1000 sleepers per kilo meter, holes are drilled for each bearing plate at the earmarked spot on tarmac or concrete roadways and two foundation bolts 710 are grouted per bearing plate. These two foundation bolts 1 at opposite sides receive the bearing base plate 720 which has molded double-jaw at its outer top side wherein the rail's outer flat bottom will rest. At inner side, after resting the rail on its bearing base plate, which has 1/20 slope, a loose piece with double-jaw 730 is tightened to the bearing base plate with two studs 760 with nuts 770. Before tightening, the loose double-jaw is locked into the long molded cavity at the rear side of the bearing base plate 720. Then the two foundation bolts 1 are tightened with rectangular washers 740 and nuts 750 firmly to the road surface. An inverted T-section 790 has double rivet holes at its both ends. Both the bearing plates have also two rivet holes at the end of its rear molded double-bracket 780. All these three pieces make one sleeper by riveting the holes.

FIG. 8 is a plan view of an economy sleeper's bearing plate of the present invention of rail cum road vehicles. These sleepers are used only at two rail joints to firmly hold both the ends of rails. This bearing plate 810 has molded triple-jaw at its outer top side. It differs from the prior arts in its design, weight and material. Its width is about 230 mm and length is about 250 mm. According to the present invention, these sleepers are bolted to the hard road surface at the spot where two rail joints are to be joined, unlike the existing railways where their heavy concrete sleepers are placed on thick layer of ballasts. Before bolting the economy sleeper's bearing plates 810 to the ground where two rail ends are joined by keeping one meter gap in between the sleepers or in other words only 1000 sleepers per kilo meter, holes are drilled for each bearing plate at the earmarked spot on tarmac or concrete roadways and four foundation bolts 700 are grouted per bearing plate to the ground. These four foundation bolts 700 at opposite sides receive the bearing base plate 810 which has molded triple-jaw at its outer top side wherein the rail's outer flat bottom will rest. At inner side, after resting the two rail ends on its bearing base plate 810, which has 1/20 slope, the triple-jaw loose piece 830 is tightened to the bearing base plate 810 with two studs 760 and two nuts 770. Before tightening, the loose jaw is locked into the long molded cavity at the rear side of the bearing base plate 810. Then the four foundation bolts 700 are tightened with rectangular washers 740 and nuts 750 firmly to the road surface. An inverted T-section 790, shown hidden has double rivet holes at its both ends. Both the bearing plates have also two rivet holes at the end of its rear molded double-bracket 780. All these three pieces make one sleeper by riveting the holes.

One shim 800 with 1 in 20 slope, its length is about 125 to 150 mm and its inner width is equal to the width of flat bottom of the rail to be laid on it, is placed in between road surface and rail bottom to hold the rail's flat bottom in the middle of two bearing plates of two sleepers to fill the gap between road surface and rail flat bottom.

While this invention has been described and shown through drawings it will be obvious to those skilled in the art that further modifications and changes may be made without departing from the invention in its broader aspects, and therefore, the aim in the appended claims is to cover all such changes and modification as fall within the scope of the invention or limits of the claims appended hereto.

What is claimed is:

1. A rail cum road vehicle for use to run on a rail track with a pair of rails or on plain roads, comprising:
    one or more passenger or goods vehicles or a trailer cum semi-trailer, each including rubber wheels, steel wheels, a first air suspension system with hanger brackets and air suspensions, pneumatic brakes, and couplers;
    a gas powered hybrid engine coach linked to pull the one or more passenger or goods vehicles or a trailer cum semi-trailer, wherein the gas powered hybrid engine coach includes a steering system having elements connected to a pair of front rubber wheels with a first axle, a second axle with a pair of steel wheels associated with a chassis, an engine and a generator cum motor associated the chassis for driving the steel wheels, a power train powered by the engine or the generator cum motor to transmit power via a link gear box, a main gear box, and a differential for driving the pair of steel wheels; wherein, the main gear box is configured with auto transmission; the link gear box includes two main shafts and three gears coupled to the engine or generator cum motor by a sliding coupler, wherein one of the three gears is a sliding idle gear arranged between the other two of said three gears in connection with the two main shafts; the steel wheels are configured to transmit rotating power to a pair of adjoining rubber wheels through sprockets and chains; a frame with a pair of rail track pneumatic brake-set is arranged behind the steel wheels and supported by extended axle arms, wherein the track pneumatic brake set comprises a double cylinder piston block with a pair of brake shoes and operated by a pair of overhead airbags; an air suspension is configured to lift the steel wheels above the rail track to enable the vehicle to run on plain roads, and an air suspension is configured to lift the rubber wheels to travel on rails; the rubber wheels and the steel wheels have first and second diameters, respectively, wherein the first diameter is larger than the second diameter; and wherein the gas powered hybrid engine coach further comprises at least one of the following:
        the pair of steel wheels being a pair of flangeless steel wheels of a large hybrid engine coach, being positioned between two pairs of flanged steel wheels, and receiving rotating power from the engine or the motor cum generator through the differential; and
        a circular bogie motorized with rack and pinion and including safety locks at its front and rear sides, a center plate configured to rotate up to thirty five degrees for rear steering while travelling on plain roads, wherein the circular boogie has a central steel wheel axle arranged between two rubber wheel and axle sets, and connected to one of the two rubber wheel and axle sets by sprockets and chains; and
    wherein, the one or more passenger or goods vehicles or a trailer cum semi-trailer is one of the following:
        an articulate hybrid engine coach that includes a first differential axle with the steel wheels in the form of flanged steel wheels configured to transmit rotating power to the rubber wheels, an articulate frame at a rear end associating with a second differential axle of a second pair of flanged steel wheels configured to transmit rotating power to rear rubber wheels through sprockets and chains;
        a caravan/ambulance that includes two axles of the steel wheels in the form of flanged steel wheels between two axles of the rubber wheels at front and rear ends of a chassis, an engine and a generator cum motor gear box arranged at the rear end of the chassis;
        a trailer cum semi-trailer that includes a circular bogie with an axle of steel wheels in the form of flanged steel wheels arranged between two axles of the rubber wheels; wherein, the circular bogie is located at a rear end a chassis; a king pin is arranged at front end of the chassis; a pair of telescopic landing gear is arranged behind the king pin; a complete set of detachable frame is arranged under the chassis with a pair of mini flanged steel wheels arranged at a front end of the frame; and an axle with a pair of flanged steel wheels is arranged in front of a pneumatic brake set; and
        a passenger coach that includes an axle with a pair of front flanged steel wheels associated with a chassis at its front end, and an axle with the rubber wheels associated with the chassis in between the front flanged steel wheels and a rear circular bogie.

2. The rail cum road vehicles of claim 1, wherein the steering system is disengageable while traveling on the rail track.

3. The rail cum road vehicle of claim 1, wherein the gas powered hybrid engine coach includes at least two steel wheels and at least two rubber wheels rotate independently.

4. The rail cum road vehicle of claim 1, wherein the sliding coupler associated with the link gear box is configured to engage the engine or the generator cum motor with the main gear box.

5. The rail cum road vehicle of claim 1, wherein the sliding idle gear in the link gear box is configured to either engage or disengage the two other gears of the three gears to drive the steel wheels either by the engine or by the generator cum motor; and wherein during a regenerative braking, the two other gears of the three gears are configured to engage with the sliding idle gear, and the engine is configured to be simultaneously disengaged.

6. The rail cum road vehicle of claim 1, including at least some steel wheels having flanges for contacting corresponding sides of the rails.

7. The rail cum road vehicle of claim 1, further including a tension maintaining mechanism that includes a first spring-loaded mini sprocket configured to press down an associated chain from a top of the chain, and a second spring-loaded mini sprocket configured to push up the associated chain from a bottom of the chain.

8. The rail cum road vehicle of claim 1, wherein the circular bogie further includes multiple rollers positioned on a top surface of the circular bogie, and a greased rubber sheet provided at the center plate to allow smooth movements.

9. The rail cum road vehicle of claim 1, wherein the rail track includes a corrugated concrete track.

10. The rail cum road vehicle of claim 1, in combination with a corrugated concrete track, wherein the track is laid on a tarmac or concrete roadway with mountings in the form of bearing plates attached to steel sleepers by bolting, and has a maximum width up to 600 mm.

* * * * *